Aug. 11, 1931. S. J. DOW, JR 1,818,310
DIFFERENTIAL SPEED POWER TRANSMISSION DEVICE
Filed Feb. 15, 1930 2 Sheets-Sheet 2
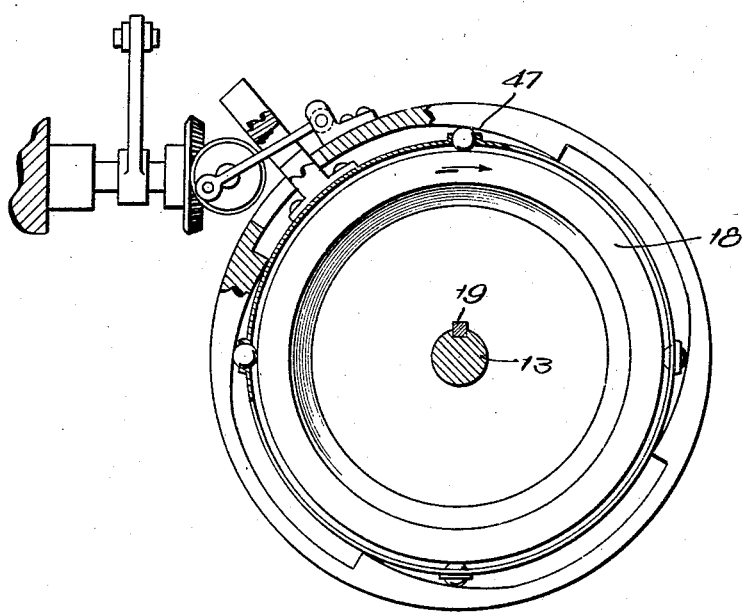
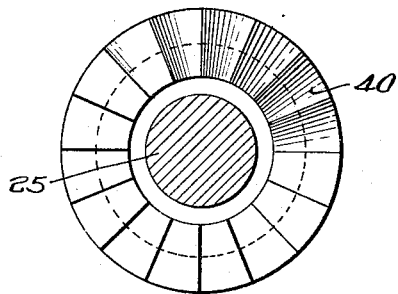
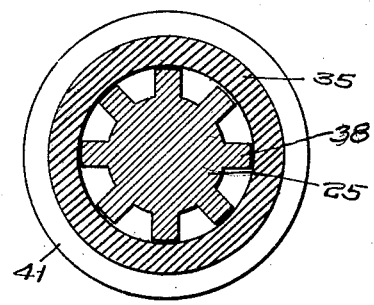
Inventor
Scott J. Dow Jr.

Patented Aug. 11, 1931

1,818,310

UNITED STATES PATENT OFFICE

SCOTT J. DOW, JR., OF HINSDALE, ILLINOIS

DIFFERENTIAL SPEED POWER TRANSMISSION DEVICE

Application filed February 15, 1930. Serial No. 428,601.

This invention relates to improvements in differential speed power transmission devices.

This invention is designed primarily to avoid the use of gear shifting devices or appliances, and to utilize a group of gears constantly in mesh, in conjunction with clutch elements for varying the speed ratio from zero to engine speed, by two definite stages, with adequate provision for a single reverse speed.

The device is intended primarily for use on motor driven vehicles, although it is adapted for other uses in which varying speed ratios are required.

Further objects and details of the invention will appear from a description thereof in conjunction with the accompanying drawings, wherein—

Fig. 2 is a cross sectional view taken on line 2—2 of Fig. 1; and

Figure 1:
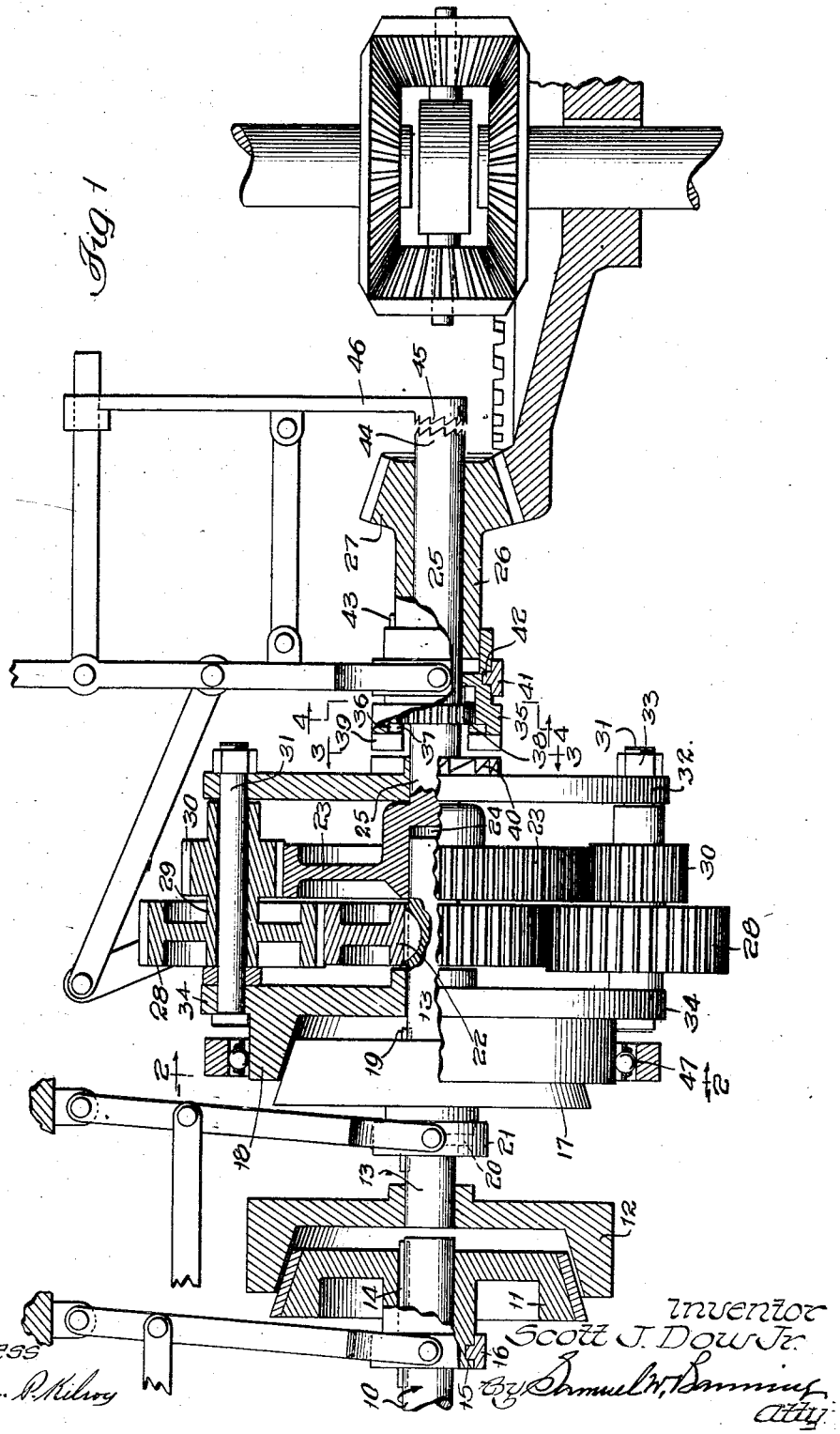
Figure 1 is an elevation partly in section of the mechanism as applied to the driving of an automobile.

Figs. 3 and 4 are detail sectional views taken respectively on lines 3—3 and 4—4 of Figure 1.

In the mechanism as shown, the shaft 10 may be considered as the engine shaft, or direct driving shaft, from which the power is derived. Upon the shaft 10 is mounted a driving clutch element 11 which coacts with a driven clutch element 12 fixedly mounted upon an intermediate shaft 13 which is aligned with the driving shaft.

As shown, the clutch elements 11 and 12 are of cone clutch formation, although it is not the intention to limit the invention to clutch elements of this character. The clutch element 11, which in the present instance is the male element, is slidably mounted upon the driving shaft 10 by the provision of a key 14, and the clutch element is provided with a grooved neck 15 which receives the yoke 16 for shifting the clutch element longitudinally of the shaft 10.

The intermediate shaft 13 has slidably mounted thereon a driving clutch element 17 of male cone formation, which coacts with a driven clutch 18 of female cone formation. The driving element 17 is slidably mounted upon a key 19 and is provided with a grooved neck 20 which receives a yoke 21.

The driven element 18 is freely mounted upon the intermediate shaft 13, and the shaft also carries a fixedly mounted center pinion 22 which may be considered as the driving center pinion, and also a freely mounted center pinion 23 having a slightly greater diameter than the pinion 22.

The hub of the driven pinion 23 is cored at 24 to receive the end of the intermediate shaft 13, and the hub terminates in a rearwardly extending stem 25 which is aligned with the shafts 10 and 13, and is freely mounted within a tubular shaft 26 which may be considered as the driven shaft and carries a bevel pinion 27 at its rear end.

The fixedly mounted driving center pinion 22 meshes with two or more planetary pinions 28 which are carried by an elongated sleeve or hub 29 which also mounts smaller pinions 30, which latter mesh with the driven freely mounted center pinion 23.

It will be observed that the smaller center pinion meshes with the larger planetary pinions, and that the larger center pinion meshes with the smaller planetary pinions. The planetary pinions are freely and rotatably mounted upon fixed stub shafts 31, the rear ends of which are entered through a plate 32 and secured by nuts 33. The forward ends of the stub shafts 31 are entered through a flange 34 outwardly projecting from the driven clutch element 18, which arrangement gives to the structure including said clutch element, the shafts and the plate 32, a cage formation which is mounted for free rotation in conformity with movements imparted thereto through the gear train.

The tubular shaft 26 terminates at its forward end within a sliding clutch collar 35 which closely embraces the end of the tubular shaft, and the clutch collar is inwardly grooved or channeled at 36 to provide a circumferential clutch having clutch teeth 37, which are adapted to mesh with outwardly projecting clutch teeth 38 formed around the stem 25. The end teeth 39 on the collar are configured to engage with clutch teeth 40 formed on the rear face of the plate 32.

When the clutch collar stands in its medial position, it will be disengaged from either the stem 25 or the plate 32, but can be moved to secure either engagement by means of a yoke 41 which engages a groove 42 in the wall of the clutch collar, which latter is slidably mounted upon the tubular shaft 26 through the provision of a key 43.

The end of the stem 25 as shown is provided with teeth 44 which may be engaged by teeth 45 carried by a slidably mounted locking plate 46 which is adapted to be secured to any suitable portion of the framing of the car or other structure with which the gear assembly is associated, so that when moved into engaging relation with the stem 25 it will lock the latter against rotation.

The driven clutch element 18 may be locked against rotation in a reverse direction, by means of a ratchet ring 47, which as shown is in the form of a ball ratchet, although any other form of ratchet mechanism may be provided.

The ball ratchet may be adjusted to function in preventing reverse movement of the gear element 18 when desired, or readjusted to free said gear element from such restraint where reverse movement thereof is desirable.

In order to indicate that the slidably mounted locking plate 46, the clutch yoke 41, and the ratchet ring operate in unison, these elements have been shown diagrammatically as being connected together by any suitable form of linkage or other connection adaptable to local requirements in which the mechanism is being used.

*Operation*

We may assume that the engine shaft 10 is freely rotated at full driving speed with the clutch elements 11—12 and 17—18 disengaged. Also we may assume that the ratchet ring is in engagement with the driven clutch element 18 to prevent reverse movement thereof; that the clutch teeth 37 are in engagement with the clutch teeth 38 on the stem 25, which couples the tubular shaft 26 with the stem 25 and establishes a driving connection through the stem to the tubular shaft. We also may assume that the locking teeth 45 are disengaged.

With the parts thus adjusted, the clutch element 11 is engaged with the clutch element 12, the secondary clutch elements 17—18 remaining disengaged. This conditions the mechanism for driving at a reduced speed, which may be referred to as the first speed. With this adjustment, the intermediate shaft 13 will be driven at engine speed, and the fixed center driving pinion 22 will rotate at full engine speed.

By reason of the gear relation, this tends to cause a slow reverse orbital rotation of the cage carrying the planetary gears, because of the resistance of the driven load transmitted to the pinion 23, but in view of the fact that in this adjustment the ratchet ring is set to prevent reverse movement of the clutch element 18 and cage associated therewith, it is evident that the pinions 28 and 30 will be held against orbital travel, so that a slow or first speed forward rotative movement will be imparted through the gearing to the freely mounted driven center pinion 23 and thence through the stem 25 and clutch teeth on the collar 35 to the tubular shaft 26 which carries the bevel pinion 27. This will impart a first or slow speed to the rear axle of the car or other driven mechanism with which the gear assembly is associated.

The slow speed, in ratio to the engine speed, can be determined by the ratio of the center pinions and planetary pinions constituting the gear assembly. With the car or other mechanism operating at slow speed, the secondary clutch elements 17—18 can be gradually thrown into completely clutched relationship which will build up the speed from slow speed to engine speed as the clutch elements take hold, so that with the clutch elements completely engaged the entire cage and gear assembly will stand in locked relation to the engine shaft, and the tubular shaft will necessarily rotate at engine speed.

Where it is desired to secure a reverse direction at slow speed, the locking teeth 45 are thrown to engage the teeth 44 and lock the stem 25 against rotation and simultaneously the clutch collar 35 is shifted to engage its teeth 39 with the teeth 40 on the cage plate 32 and the ratchet ring is disengaged to permit reverse rotation of the clutch element 18 and the associated cage. Through the action of the center pinions and planetary pinions, this causes a reverse rotation to be imparted to the cage, the secondary clutch 17—18 being disengaged, and this reverse rotation is transmitted through the clutch collar 35 and tubular shaft 26 to the pinion 27.

In order to utilize this reverse rotation in driving, it is, of course, necessary to meanwhile hold the pinion 23 against rotation, but this is provided for by the locking of the stem 25 to some fixed portion of the car or other structure through the adjustment of the locking plate 45. With the parts thus adjusted, the reverse driving at slow speed will occur.

The arrangement is one which completely eliminates the shifting of gears and at the same time divides the clutching action between two separate sets of clutch elements, so that excessive wear of the clutch surfaces will be avoided. That is to say, the primary clutch elements 11 and 12 function only in building the speed up from zero to the first slow speed, while the secondary clutch elements 17—18 function only to build the speed up from slow speed to engine speed, so that in no case will excessive demands be made upon the clutch elements which might unduly wear the clutching surfaces. Any suitable and convenient arrangement of levers or controls may be employed for regulating the successive or concurrent adjustments required in conditioning the gear assembly to drive in the direction or at the speed required, and the particular details of the lever control constitute no portion of the present invention.

I claim:

1. In a power transmission assembly, the combination of a driving shaft, an intermediate shaft and a tubular driven shaft in aligned relation, clutch elements for engaging the driving and intermediate shafts, a cage rotatably mounted upon the intermediate shaft, clutch elements for engaging said cage to the intermediate shaft, a driving center pinion fixedly mounted upon the intermediate shaft, a driven center pinion having a different diameter and freely mounted upon the intermediate shaft, orbital gear elements differing in diameter and carried by the cage and meshing respectively with the driving and driven center pinions, a stem secured to the driven center pinion and extending through the tubular driven shaft, means for locking and unlocking said stem to prevent or permit rotation thereof, means for clutching the driven tubular shaft either to the cage or to the stem, and means for either locking the cage against reverse rotation, or unlocking the same to permit such rotation.

2. In a power transmission assembly, the combination of a driving shaft, an intermediate shaft and a driven shaft, means for clutching the driving shaft to the intermediate shaft, an orbital gear assembly, means for transmitting rotation through said orbital gear assembly from said intermediate shaft to the driven shaft at reduced speed, and means for engaging said assembly as a whole to the intermediate shaft, means for restraining said gear assembly against reverse rotation, said means being adjustable to permit such reverse rotation, means for locking said gear assembly to said driven shaft and means for locking a central member of said orbital gear assembly against rotation to compel reverse orbital travel of the gear assembly when locked to the driven shaft.

3. In a power transmission mechanism, the combination of a driving shaft, an intermediate shaft and a tubular driven shaft, all in aligned relation, clutch elements for engaging the driving shaft with the intermediate shaft, an orbital gear assembly carried by the intermediate shaft, means for clutching or unclutching the gear assembly as a whole to the intermediate shaft, a stem extending through the tubular driven shaft and attached to one of the members of said gear assembly, locking means for optionally holding said stem against rotation, means for restraining the gear assembly against reverse rotation, or for permitting such rotation, and means for clutching the tubular driven shaft either to the gear assembly or to the stem.

In witness that I claim the foregoing I have hereunto subscribed my name this 20th day of January, 1930.

SCOTT J. DOW, Jr.